US011425457B2

(12) United States Patent
Yamagishi (10) Patent No.: US 11,425,457 B2
(45) Date of Patent: Aug. 23, 2022

(54) ENGAGEMENT ESTIMATION APPARATUS, ENGAGEMENT ESTIMATION METHOD AND PROGRAM

(71) Applicant: Nippon Telegraph and Telephone Corporation, Tokyo (JP)

(72) Inventor: Kazuhisa Yamagishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/053,236

(22) PCT Filed: Apr. 23, 2019

(86) PCT No.: PCT/JP2019/017183
§ 371 (c)(1),
(2) Date: Nov. 5, 2020

(87) PCT Pub. No.: WO2019/216197
PCT Pub. Date: Nov. 14, 2019

(65) Prior Publication Data
US 2021/0314661 A1    Oct. 7, 2021

(30) Foreign Application Priority Data

May 9, 2018    (JP) .............................. JP2018-090896

(51) Int. Cl.
*H04H 60/32*    (2008.01)
*H04N 21/442*    (2011.01)
(Continued)

(52) U.S. Cl.
CPC . *H04N 21/44222* (2013.01); *H04N 21/26208* (2013.01); *H04N 21/44204* (2013.01); *H04N 21/47217* (2013.01)

(58) Field of Classification Search
CPC ......... H04N 21/44222; H04N 21/4524; H04N 21/6332; H04N 21/4424
(Continued)

(56) References Cited

U.S. PATENT DOCUMENTS 10,178,043 B1 *  1/2019  Ganjam ................ H04L 47/801
2009/0262198 A1  10/2009  Yamagishi et al.
(Continued)

FOREIGN PATENT DOCUMENTS

JP     2010-252400     11/2010
WO     WO 2017/104416   6/2017

OTHER PUBLICATIONS

[No Author Listed], "Series P: Telephone Transmission Quality, Telephone Installations, Local Line Networks—Models and Tools for Quality Assessment of Streamed Media," International Telecommunication Union, Nov. 2016, 20 pages.
(Continued)

*Primary Examiner* — Jivka A Rabovianski
(74) *Attorney, Agent, or Firm* — Fish & Richardson P.C.

(57) ABSTRACT

An engagement estimation apparatus includes: an acquisition unit configured to acquire a value of a parameter affecting a quality of video streaming in a certain period; and a calculation unit configured to substitute the value of the parameter acquired by the acquisition unit in an equation representing a relation between the parameter indicative of the quality and engagement with the video streaming to calculate a value of an index indicative of the engagement, thereby enabling estimation of the engagement with the video streaming.

7 Claims, 5 Drawing Sheets

(51) Int. Cl.
*H04N 21/262* (2011.01)
*H04N 21/472* (2011.01)

(58) Field of Classification Search
USPC .............................................. 725/10, 14, 44
See application file for complete search history.

(56) References Cited

U.S. PATENT DOCUMENTS

2010/0211966 A1* 8/2010 Zhang ................ H04N 21/4223
725/10
2018/0332326 A1 11/2018 Yamagishi

OTHER PUBLICATIONS

Takahashi et al., "Adaptive Bitrate Video Distribution Service Analysis of User Integration with Analysis of User Manipulation for Adaptive Bitrate Video Streaming Services," IEICE, Technical Report, 2017, 117(304):39-44, 13 pages (with English Translation).
Yamagishi et al., "Parametric Quality-Estimation Model for Adaptive-Bitrate-Streaming Services," IEEE Transaction on Multimedia, Jul. 2017, 19(7):1545-1557.

* cited by examiner

ENGAGEMENT ESTIMATION APPARATUS, ENGAGEMENT ESTIMATION METHOD AND PROGRAM

CROSS-REFERENCE TO RELATED APPLICATIONS

This application is a National Stage application under 35 U.S.C. § 371 of International Application No. PCT/JP2019/017183, having an International Filing Date of Apr. 23, 2019, which claims priority to Japanese Application Serial No. 2018-090896, filed on May 9, 2018. The disclosure of the prior application is considered part of the disclosure of this application, and is incorporated in its entirety into this application.

TECHNICAL FIELD

The present invention relates to an engagement estimation apparatus, an engagement estimation method, and a program.

BACKGROUND ART

Communication services (voice communications, video communications, Web, IoT, and the like) that transfer video, sound (hereinafter, also including voice), text, and the like between terminals and between a server and a terminal have been widely used.

Because the communication quality of the Internet is not necessarily guaranteed, communications using voice media, video media, or the like can involve a reduction in bit rates due to a narrow line bandwidth between a viewer terminal and a network, as well as packet loss, packet transfer delay, and packet retransmission due to congestion of the line, resulting in deterioration of the quality of the audio media, the video media, or the like perceived by the viewer.

Specifically, in adaptive bitrate video streaming in which video media is delivered with the bit rates changed depending on the state of the throughput of a network, the sound quality and image quality decrease with a decrease in the throughput, and playback start waiting and playback stop occur in association with buffer processing caused when a predetermined amount of data has not been accumulated in a buffer of a receiver terminal. In addition, due to fluctuation of the throughput, the image quality (resolution, bit rate, frame rate) of the chunk fluctuates.

The bit rate reduction, playback start waiting, playback stop, and the like affect not only the quality experienced by the user but also engagement (viewing time, viewing acceptance and interruption, viewing cancel, and the like).

Thus, to check that a video streaming provider has provided video communication services as described above with good quality and engagement, it is important to enable measurement of the quality of and engagement with audio visual experienced by viewers and monitoring of high quality of and engagement with audio visual provided to viewers.

Consequently, there is a need for a quality estimation technique and an engagement estimation technique capable of appropriately representing the quality of and engagement with audio visual experienced by viewers.

Known objective quality evaluation methods include the technique described in ITU-T Recommendation P.1203 described in NPL1 and the technique described in NPL2. These techniques are to estimate a quality using quality parameters such as video resolution, frame rate, bit rate, playback start waiting time, playback stop time, and the like from packets received at a receiver terminal (smartphone or set-top box (STB)). In other words, these techniques offer nothing more than estimation of quality evaluation values.

CITATION LIST

Non Patent Literature

NPL1: Parametric bitstream-based quality assessment of progressive download and adaptive audiovisual streaming services over reliable transport, ITU-T P.1203

NPL2: 2. K. Yamagishi and T. Hayashi, "Parametric Quality-Estimation Model for Adaptive-Bitrate Streaming Services", "IEEE Transactions on Multimedia, 2017. DOI: 10.1109/TMM.2017.2669859.

SUMMARY OF THE INVENTION

Technical Problem

If a video streaming provider attempts to monitor engagement with video streaming (viewing time, viewing acceptance/interruption), an engagement estimation technique will be required; however, there is currently no such technique available.

In view of the above problem, an object of the present invention is to enable estimation of engagement with video streaming.

Means for Solving the Problem

To solve the above-described problem, an engagement estimation apparatus includes: an acquisition unit configured to acquire a value of a parameter affecting a quality of video streaming in a certain period; and a calculation unit configured to substitute the value of the parameter acquired by the acquisition unit in an equation representing a relation between the parameter indicative of the quality and engagement with the video streaming to calculate a value of an index indicative of the engagement.

Effects of the Invention

Engagement with video streaming can be estimated.

DESCRIPTION OF EMBODIMENTS

Figure 1:
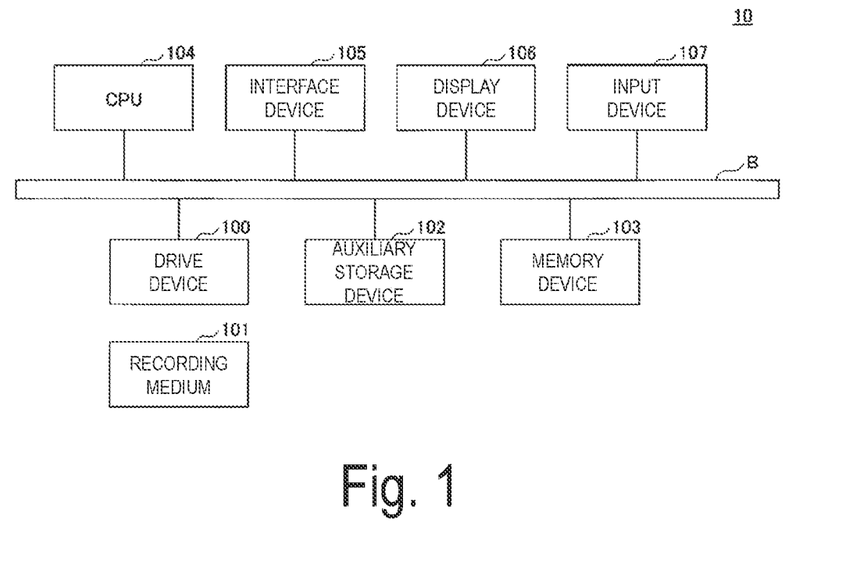
FIG. 1 is a diagram illustrating an example of a hardware configuration of a viewer terminal 10 according to an embodiment of the present invention.

Hereinafter, embodiments of the present invention will be described with reference to the drawings. FIG. 1 is a diagram illustrating an example of a hardware configuration of a viewer terminal 10 according to an embodiment of the present invention. The viewer terminal 10 in FIG. 1 includes a drive device 100, an auxiliary storage device 102, a memory device 103, a CPU 104, an interface device 105, a display device 106, an input device 107, and the like. These components are connected to each other via a bus B.

A program for implementing processing at the viewer terminal 10 is provided by a recording medium 101 such as a CD-ROM. If the recording medium 101 storing the program is set in the drive device 100, then the program is installed in the auxiliary storage device 102 from the recording medium 101 via the drive device 100. However, the program is not necessarily installed from the recording medium 101 and may be downloaded from another computer via a network. The auxiliary storage device 102 stores the installed program and also stores required files, data, and the like.

The memory device 103 reads and stores the program from the auxiliary storage device 102 in a case where a command for activating the program is issued. The CPU 104 implements a function related to the viewer terminal 10 according to the program stored in the memory device 103. The interface device 105 is used as an interface for connecting to a network. The display device 106 displays a graphical user interface (GUI) or the like provided by the program. The input device 107 includes a keyboard and a mouse, or the like, and is used to input various operation commands.

Figure 2:
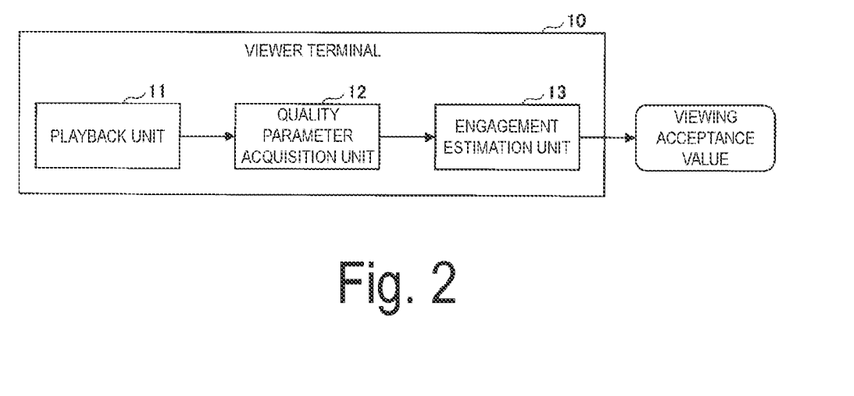
FIG. 2 is a diagram illustrating an example of a functional configuration of the viewer terminal 10 according to the embodiment of the present invention.

FIG. 2 is a diagram illustrating an example of a functional configuration of the viewer terminal 10 according to the embodiment of the present invention. The viewer terminal 10 is a terminal that is used for viewing a content (video or the like) delivered in adaptive bitrate video streaming. In FIG. 2, the viewer terminal 10 includes a playback unit 11, a quality parameter acquisition unit 12, an engagement estimation unit 13, and the like. Each of these units is implemented by processing that one or more programs installed on the viewer terminal 10 cause the CPU to execute. That is, each of these units is implemented by cooperation between the hardware resources of the viewer terminal 10 and the program(s) (software) installed on the viewer terminal 10.

The playback unit 11 downloads, from a server, a content delivered in the adaptive bitrate video streaming (hereinafter simply referred to as "video streaming") chunk by chunk and plays the content. The playback unit 11 may be implemented by a common application that plays a content delivered in video streaming.

The quality parameter acquisition unit 12 and the engagement estimation unit 13 have functions for estimating engagement that a viewer (a user of the viewer terminal 10) finally has.

The quality parameter acquisition unit 12 acquires, for each preset unit time (e.g., 1 second, 1 minute, 5 minutes, or 1 hour), values of parameters (hereinafter referred to as "quality parameters") constituting the information (quality factors) affecting the quality of the video streaming at the unit time. Examples of the quality parameters include the resolution of each chunk of the video streaming, the frame rate of each chunk, the bit rate of each chunk, the playback start waiting time per unit time, the playback stop time per unit time, and the like. These quality parameters can be measured in the playback unit 11. Thus, the quality parameter acquisition unit 12 acquires the values of these quality parameters from the playback unit 11. The unit time is hereinafter referred to as a "measurement section". Note that the measurement section is equal to or greater than the length of a chunk (playback time).

The engagement estimation unit 13 estimates engagement per measurement section using the values of the quality parameters acquired by the quality parameter acquisition unit 12. In the present embodiment, a description is given with viewing acceptance as an example of an index of engagement. Viewing acceptance refers to a degree of acceptance indicating an intension to continue viewing. In other words, the engagement estimation unit 13 calculates a viewing acceptance value that is a numerical value indicating the viewing acceptance.

The method for estimating the viewing acceptance value by the engagement estimation unit 13 has a characteristic (a logarithm, a logistic function, or the like) that increases the viewing acceptance value in a case where neither playback start waiting nor playback stop occurs and the viewing quality of the video streaming (the quality experienced by viewers) increases. The estimation method also has a characteristic that decreases the viewing acceptance value in a case where the playback start waiting time or the playback stop time increases. These characteristics are derived from the findings obtained, in a subjective evaluation experiment conducted by the inventors of the present invention using a plurality of video images having different quality levels (resolution, bit rate, frame rate, and the like), by measuring a proportion of subjects, among all the subjects experimented, who stopped viewing in the middle and by having them view video images to the end and evaluate viewing acceptance, for example. The characteristics derived from these findings will be described in further detail using FIGS. 3 and 4.

Figure 3:
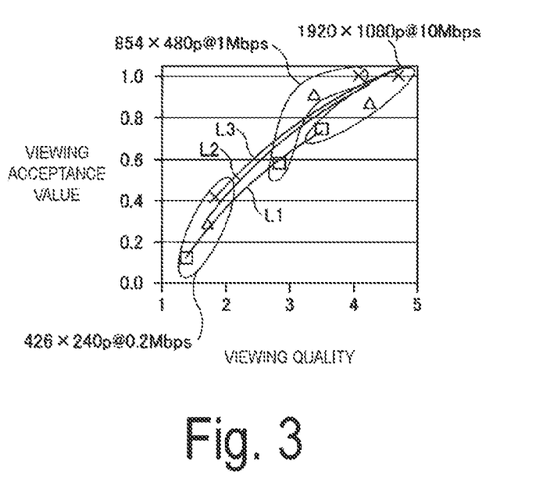
FIG. 3 is a first diagram for describing characteristics related to viewing acceptance.

FIG. 3 is a first diagram for describing characteristics related to viewing acceptance. In FIG. 3, the horizontal axis indicates viewing quality and the vertical axis indicates the viewing acceptance value. The x marks, triangles, and squares indicate relations between the viewing acceptance value and the viewing quality when only the bit rate and the resolution change (426×240 pixels at 0.2 Mbps, 854×480 pixels at 1 Mbps, 1920×1080 pixels at 10 Mbps, from the left). The x marks indicate a characteristic with neither playback start waiting nor playback stop. The triangles indicate a characteristic in which a 24-second playback start waiting time is added to the condition of the x marks. The squares indicate a characteristic in which a 24-second playback stop time is added to the condition of the x marks. Curve L1 is an approximation curve related to the squares, curve L2 is an approximation curve related to the triangles, and curve L3 is an approximation curve related to the x marks.

Focusing on the respective bit rates and resolutions, it has been found that while the relation of the viewing quality and the viewing acceptance value decreasing in the order of the x marks, triangles, and squares is maintained, curves L1 to L3 are shifted significantly, which means that the trend of increasing the viewing acceptance value relative to the viewing quality differs significantly among the x marks, triangles, and squares (i.e., differs significantly with or without playback start waiting time or playback stop time).

In this manner, the viewing acceptance value cannot be formulated simply from viewing quality, and has different characteristics for respective quality factors (for each playback start waiting time, for each playback stop time, for each set of quality affected by coding (resolution, bit rate, frame rate)).

Figure 4:
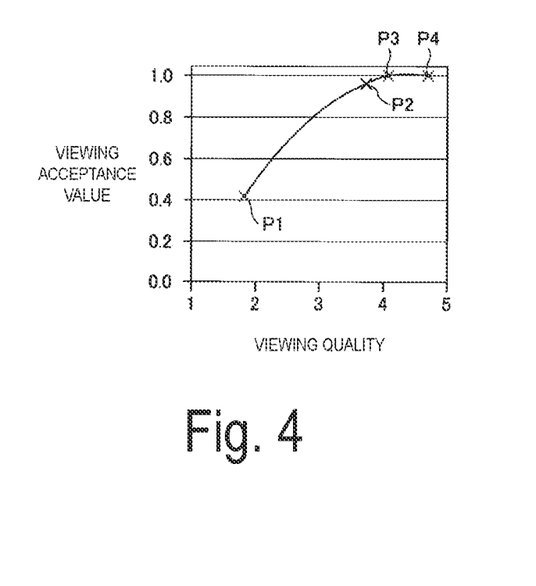
FIG. 4 is a second diagram for describing characteristics related to viewing acceptance.

FIG. 4 indicates a relation between viewing quality and viewing acceptance in a case where neither playback start waiting nor playback stop has occurred, like in the case with the x marks in FIG. 3, under the conditions that the resolution and the bit rate change (426×240 pixels at 0.2 Mbps, 854×480 pixels at 1 Mbps, 1920×1080 pixels at 10 Mbps) and the quality is further varied from 854×480 pixels at 1 Mbps every 30 seconds. That is, plots P1, P2, and P4 in FIG. 4 correspond to three plots of the x marks in FIG. 3. Plot P3 indicates a relation between the viewing quality and the viewing acceptance value under the condition that the quality is varied from 854×480 pixels at 1 Mbps every 30 seconds.

According to FIG. 4, it can be seen that the relation between the quality affected by coding and the viewing acceptance value can be expressed by a logistic function.

Thus, in the present embodiment, the viewing acceptance value is calculated from the following Equation (1).

$$A = (a - a/(1 + (AVQC)^c)) \exp(-dI) \exp(-eS) \quad (1)$$

In the equation, "a", "b", "c", "d", and "e" are predetermined coefficients, A is a viewing acceptance value. AVQC is a quality value derived using the coefficients indicated by Equations 1 to 9 and Table V in NPL2. I is a playback start waiting time, and S is a playback stop time.

That is, in Equation (1), "$(a-a/(1+(AVQC)^c))$" means that the viewing acceptance value can be expressed by a logistic function using the quality parameters (resolution, bit rate, frame rate) affected by coding. In addition, in "$\exp(-dI)\exp(-eS)$", the relation between each of the playback start waiting time and the playback stop time and the viewing acceptance value is expressed as an exponential function, because it can be seen from FIG. 3 that the viewing acceptance value is formulated from a curve independent of the playback start waiting time and playback stop time.

Note that Equation (1) is merely an example. Any other equations that can take into consideration the aforementioned characteristics may be used.

Figure 5:
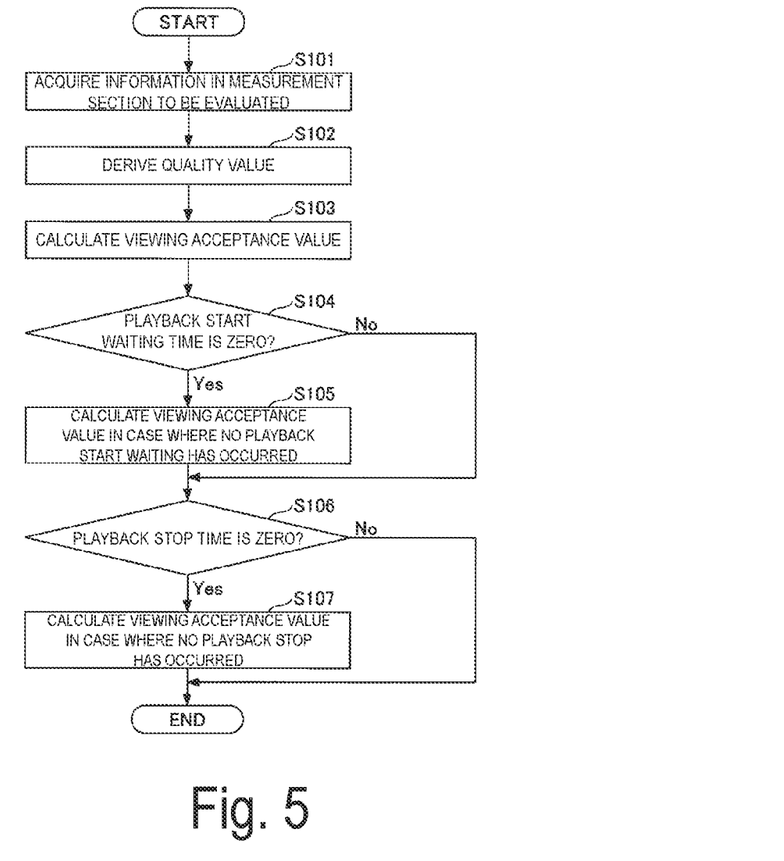
FIG. 5 is a flowchart for describing an example of a processing procedure executed by the viewer terminal 10.

A processing procedure executed by the viewer terminal 10 will be described below. FIG. 5 is a flowchart for describing an example of the processing procedure executed by the viewer terminal 10.

In step S101, the quality parameter acquisition unit 12 acquires, from the playback unit 11, the values of the quality parameters in a measurement section to be evaluated during a period in which playback is being performed by the playback unit 11. Here, among the quality parameters, quality parameters (resolution, bit rate, frame rate) affected by coding are acquired for each chunk. For example, if the length of one chunk (playback time) is 5 seconds and the measurement section is 1 minute, 12 sets of values of resolution, bit rate, and frame rate are obtained. Regarding the playback start waiting time and the playback stop time, a total value in the measurement section is obtained. Note that neither playback start waiting nor playback stop may occur. In this case, the time of the playback start waiting time or the playback stop time that has not occurred is zero.

Next, the engagement estimation unit 13 derives the quality value (AVQC) using one or more sets of the quality parameters (12 sets in the example above) affected by coding, which are acquired by the quality parameter acquisition unit 12, and the coefficients indicated by Equations 1 to 9 and Table V in NPL2 (S102).

Next, the engagement estimation unit 13 substitutes the derived quality value (AVQC) and the playback start waiting time and the playback stop time acquired by the quality parameter acquisition unit 12 in Equation (1), and calculates a viewing acceptance value in the measurement section (hereinafter referred to as a "viewing acceptance value α") (S103).

Next, the engagement estimation unit 13 determines whether the playback start waiting time acquired by the quality parameter acquisition unit 12 is zero (S104). If the playback start waiting time is zero (Yes in S104), the engagement estimation unit 13 calculates a viewing acceptance value in a case where no playback start waiting has occurred in the measurement section (hereinafter referred to as "viewing acceptance value β") (S105). The viewing acceptance value β can be calculated by substituting zero for I in Equation (1).

Next, the engagement estimation unit 13 determines whether the playback stop time acquired by the quality parameter acquisition unit 12 is zero (S106). If the playback stop time is zero (Yes in S106), the engagement estimation unit 13 calculates a viewing acceptance value in a case where no playback stop has occurred in the measurement section (hereinafter referred to as a "viewing acceptance value γ") (S107). The viewing acceptance value γ can be calculated by substituting zero for S in Equation (1).

Note that by calculating the viewing acceptance value β and the viewing acceptance value γ and comparing each of the values with the viewing acceptance value α, for example, the provider of video communication services and the like can determine the effects of playback start waiting and playback stop on viewing acceptance and can get tips on how to improve the quality of the services.

Note that while a description has been given with viewing acceptance as an example of an index indicative of engagement in the present embodiment, other indexes such as viewing time, viewing interruption, viewing cancel, and the like are also considered to have similar characteristics to viewing acceptance. Thus, for each coefficient in Equation (1), the present embodiment may be implemented by replacing an index indicative of engagement with another index by deriving a value suitable for the other index through a subjective evaluation experiment or the like.

Furthermore, in the present embodiment, an example has been described in which the values of the quality parameters are acquired in the viewer terminal 10, but the values of the quality parameters may be acquired by monitoring the network. In this case, an information processing device other than the viewer terminal 10 may include the quality parameter acquisition unit 12 and the engagement estimation unit 13 illustrated in FIG. 2.

As described above, according to the present embodiment, engagement with video streaming can be estimated by using quality parameters such as resolution, frame rate, bit rate, playback start waiting time, playback stop time, and the like.

As a result, for example, by monitoring engagement values of a video communication service actually viewed by a viewer, it is possible to easily determine whether or not the service being provided maintains at least a certain level of the viewer engagement, and it is also possible to determine and manage the engagement with the service being provided in real time.

Note that in the present embodiment, the viewer terminal 10 is an example of an engagement estimation apparatus. The quality parameter acquisition unit 12 is an example of an acquisition unit. The engagement estimation unit 13 is an example of a calculation unit. The measurement section is an example of a certain period. Equation (1) is an example of an equation that indicates a relation between a parameter indicative of quality and engagement with video streaming.

While the embodiment of the present invention has been described in detail above, the present invention is not limited to such a specific embodiment and can be subjected to various modifications and changes within the scope of the gist of the present invention disclosed in the claims.

REFERENCE SIGNS LIST

10 Viewer terminal
11 Playback unit
12 Quality parameter acquisition unit
13 Engagement estimation unit
100 Drive device
101 Recording medium
102 Auxiliary storage device
103 Memory device
104 CPU
105 Interface device
106 Display device
107 Input device
B Bus

The invention claimed is:

1. An engagement estimation apparatus comprising:
an acquisition unit, including one or more processors, configured to acquire a value of a parameter affecting a quality of video streaming in a certain period; and
a calculation unit, including one or more processors, configured to:
apply the value of the parameter acquired by the acquisition unit to an equation representing a relation between the parameter indicative of the quality and engagement with the video streaming to calculate a value of a first index (alpha) indicative of the engagement,
determine that playback start waiting does not occur,
based on the determination that the playback start waiting does not occur, calculate a value of a second index (B) indicative of the engagement,
determine that playback stop does not occur,
based on the determination that the playback stop does not occur, calculate a value of a third index indicative of the engagement, and
compare each of the value of the second index and the value of the third index with the value of the first index to generate information regarding improving the quality of the video streaming.

2. The engagement estimation apparatus according to claim 1,
wherein the parameter includes a playback start waiting time and a playback stop time, and
wherein the equation includes characteristics that increase the engagement in a case where (i) neither the playback start waiting nor the playback stop occurs and (ii) a quality experienced by a viewer increases, and decrease the engagement in a case where the playback start waiting time or the playback stop time decreases.

3. The engagement estimation apparatus according to claim 2,
wherein the parameter includes a parameter indicative of a quality affected by coding, and
wherein the equation expresses each of the first index, the second index, and the third index by a logistic function using the parameter indicative of the quality affected by the coding, and a relation between the index, the playback start waiting time, and the playback stop time is expressed by an exponential function.

4. An engagement estimation method comprising:
acquiring, by a computer, a value of a parameter affecting a quality of video streaming in a certain period;
applying, by the computer, the value of the parameter acquired in the acquiring to an equation representing a relation between the parameter indicative of the quality and engagement with the video streaming to calculate a value of a first index indicative of the engagement;
determining that playback start waiting does not occur;
based on the determination that the playback start waiting does not occur, calculating a value of a second index indicative of the engagement;
determining that playback stop does not occur;
based on the determination that the playback stop does not occur, calculating a value of a third index indicative of the engagement; and
comparing each of the value of the second index and the value of the third index with the value of the first index to generate information regarding improving the quality of the video streaming.

5. A non-transitory computer medium having stored thereon a program that causes a computer to perform operations comprising: acquiring a value of a parameter affecting a quality of video streaming in a certain period;
applying the acquired value of the parameter to an equation representing a relation between the parameter indicative of the quality and engagement with the video streaming to calculate a value of a first index indicative of the engagement;
determining that playback start waiting does not occur;
based on the determination that the playback start waiting does not occur, calculating a value of a second index indicative of the engagement;
determining that playback stop does not occur;
based on the determination that the playback stop does not occur, calculating a value of a third index indicative of the engagement; and
comparing each of the value of the second index and the value of the third index with the value of the first index to generate information regarding improving the quality of the video streaming.

6. The non-transitory computer medium according to claim 5, wherein the parameter includes a playback start waiting time and a playback stop time, and
wherein the equation includes characteristics that increase the engagement in a case where (i) neither the playback start waiting nor the playback stop occurs and (ii) a quality experienced by a viewer increases, and decrease the engagement in a case where the playback start waiting time or the playback stop time decreases.

7. The non-transitory computer medium according to claim 6, wherein the parameter includes a parameter indicative of a quality affected by coding, and
wherein the equation expresses each of the first index, the second index, and the second index by a logistic function using the parameter indicative of the quality affected by the coding, and a relation between the index, the playback start waiting time, and the playback stop time is expressed by an exponential function.

* * * * *